US009179274B2

(12) United States Patent
Lisbey et al.

(10) Patent No.: US 9,179,274 B2
(45) Date of Patent: Nov. 3, 2015

(54) LOOPING PROTECTION FOR COPY FORWARD SMS SUBSCRIBERS

(71) Applicant: Cellco Partnership, Basking Ridge, NJ (US)

(72) Inventors: Gilberto Lisbey, Bethlehem, GA (US); Bradley D. Cooper, Orchard Lake, MI (US)

(73) Assignee: Cellco Partnership, Basking Ridge, NJ (US)

( * ) Notice: Subject to any disclaimer, the term of this patent is extended or adjusted under 35 U.S.C. 154(b) by 112 days.

(21) Appl. No.: 14/012,272

(22) Filed: Aug. 28, 2013

(65) Prior Publication Data

US 2015/0065180 A1 Mar. 5, 2015

(51) Int. Cl.
*H04W 68/00* (2009.01)
*H04W 4/14* (2009.01)

(52) U.S. Cl.
CPC ....................................... *H04W 4/14* (2013.01)

(58) Field of Classification Search
CPC ....... H04W 4/14; H04W 4/12; H04W 88/184; H04M 3/48; H04M 1/72552; H04L 12/5895
USPC ........... 455/466, 445, 414.1, 433, 417, 412.1, 455/418, 415, 518, 435.1, 406, 404.1; 379/88.14, 142.07; 370/356, 329; 709/206, 207, 217
See application file for complete search history.

(56) References Cited

U.S. PATENT DOCUMENTS

| | | | | |
|---|---|---|---|---|
| 5,678,179 | A * | 10/1997 | Turcotte et al. | 455/466 |
| 5,950,126 | A * | 9/1999 | Palviainen et al. | 455/423 |
| 7,321,778 | B2 * | 1/2008 | Ignatius et al. | 455/456.5 |
| 7,397,773 | B2 * | 7/2008 | Qu et al. | 370/320 |
| 8,331,962 | B2 | 12/2012 | Chang | |
| 8,331,963 | B1 | 12/2012 | Lin et al. | |
| 2002/0013154 | A1 * | 1/2002 | Soh et al. | 455/466 |
| 2009/0070469 | A1 * | 3/2009 | Roach et al. | 709/226 |
| 2010/0304768 | A1 * | 12/2010 | Murtagh et al. | 455/466 |
| 2012/0150967 | A1 * | 6/2012 | Cai et al. | 709/206 |
| 2013/0084897 | A1 * | 4/2013 | Zawaideh et al. | 455/466 |

* cited by examiner

*Primary Examiner* — Mahendra Patel

(57) ABSTRACT

Short message service (SMS) copy forward and carbon copy methods and systems are provided. An SMS message is received at a first network device and is delivered to a first mobile device. A copy indication associated with the sender or the first mobile device instructs the first network device to send a copy of the received SMS message to a second mobile device. Responsive to the copy indication, the first network device replaces a teleservice type identifier in a teleservice space of the received SMS message with a message copy indicator based on a predetermined mapping between the teleservice type identifier and the message copy indicator, to form a modified SMS message. The modified SMS message is sent to a second network device associated with the second mobile device. The second network device detects the message copy indicator to determine whether the modified SMS message is enabled for further copying.

19 Claims, 5 Drawing Sheets

LOOPING PROTECTION FOR COPY FORWARD SMS SUBSCRIBERS

BACKGROUND

A communication device such as a cell phone may be able to communicate with one or more other devices through a wireless network, as well as a telephone network. A variety of different services may be offered for communication, including voice mail, electronic mail (i.e., email) and other messaging services such as short message service (SMS) messages. Call forwarding is a service on some telephone networks that allows an incoming call, directed to a particular telephone number, to be redirected to another telephone number specified by the called party. Similarly, email provides services such as copy forwarding and carbon copying of messages.

A need exists for providing similar copy forward and carbon copy services for short message service (SMS) messages.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
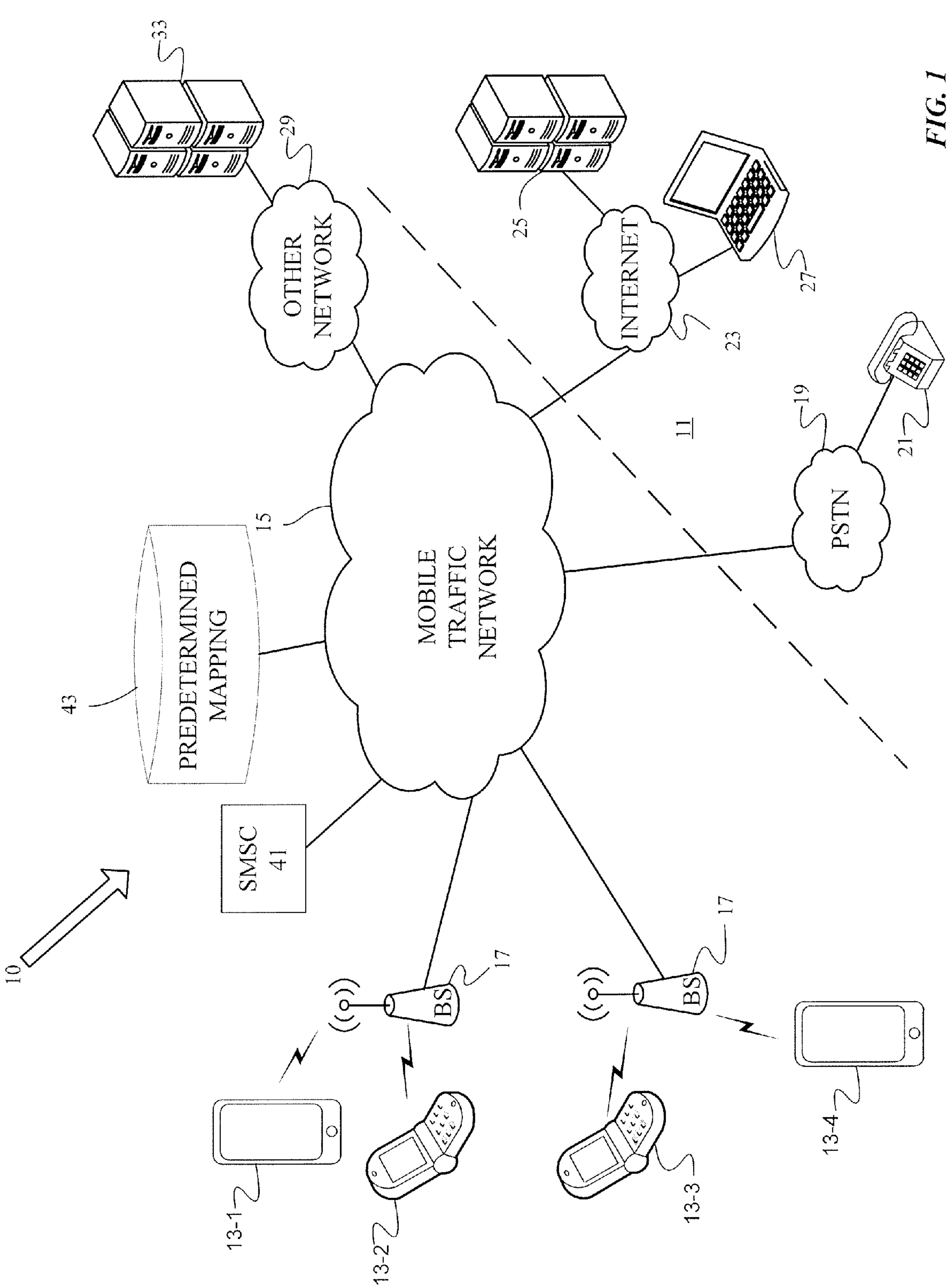
FIG. 1 is a high-level functional block diagram of an example of a system of networks/devices that provide various communications for mobile devices and supports an example of an SMS message copying service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Current signaling protocols (such as Signaling System No. 7 (SS7)) used for SMS do not consider how to accommodate message copying (such as copy forward and carbon copy). Copy forward is a service feature in which a copy of a message for a user of the service is forwarded to another party that the user has identified, for example, to forward received mail while the user is away (analogous to call forwarding). Typically, the destination of the forwarded copy may be specified by the intended recipient (e.g., while out of her office). A carbon copy feature allows a sender to send one or more additional copies of an email or other type of messages to additional recipients, e.g., as may typically be selected by the sending party. With copying features, message transmissions may be sent to multiple parties, who may themselves have similar features associated with their mail or messaging services. The mobile messaging services and the signaling protocols used for such services have not considered how to prevent copied messages from creating messaging loops among SMSCs. For example, Device A sends Device B a Message Y. Device B, in response to a copy request, sends a copy of message Y to Device C (as Copy 1). Because Device C does not know that Copy 1 is a copy of Message Y (that originated from Device A), Device C could send a further copy of message Y (as Copy 2) back to Device A, which in turn starts another round of this messaging loop by sending another copy to Device B.

The various methods disclosed herein relate to an SMS message copying service, while limiting messaging loops between network devices (examples referred to herein as SMSCs). A first network device receives an SMS message through a wireless communication network and delivers the received SMS message to a first mobile device identified as a destination for with the received SMS message. A copy indication to send a copy of the received SMS message to a second mobile device is identified at the first network device. The copy indication may be associated with the sender or the first mobile device and may instruct the first network device to send a copy of the received SMS message to the second mobile device. Responsive to identifying the copy indication, the first network device forms a modified SMS message. To form the modified SMS message, the first network device replaces a teleservice type identifier in a teleservice space of the received SMS message with a message copy indicator based on a predetermined mapping between the teleservice type identifier and the message copy indicator (e.g., as defined in a mapping table). The modified SMS message is sent through the wireless communication network to a second network device associated with the second mobile device. The second network device determines whether the modified SMS message is enabled for copying, by detecting the message copy indicator in the teleservice space of the modified SMS message.

According to one example, an SMS message copying service permits a copy to be provided for a single hop (i.e., from one SMSC to the next SMSC). When the second network device determines that the modified SMS message is enabled for copying, the message copy indicator is replaced with the teleservice type identifier in the teleservice space of the modified SMS message, to form the copy of the SMS message for delivery of the copy of the second mobile device. The replacement is based on the predetermined mapping (e.g., as defined in the mapping table). The copy is delivered to the second mobile device. The second network device also prevents any further copying of the SMS message regardless of any further copy indications from the second mobile device. Thus, detection of the message copy indicator allows one copy of the SMS message to be provided. Accordingly, the SMS message copying service may prevent messaging loops from occurring among any further network devices.

According to another example, an SMS message copying service permits message copying for multiple hops. The message copy indicator includes a predetermined range of values associated with the teleservice type identifier. At each hop, a value of the message copy indicator is decremented and provided in the teleservice space of the (further) modified SMS message. A network device at the next hop determines whether the further modified SMS message is enabled for copying, based on whether the decremented value of the message copy indicator is in the predetermined range of values. Thus, the predetermined range of values for the message copy indicator determines the number of permissible hops for copying the SMS message. Accordingly the SMS message copying service may prevent messaging loops from occurring among any further network devices.

Example SMS message copying services use a message copy indicator, to keep track of message copies. The message copy indicator replaces a teleservice type identifier in a reserved teleservice space of the SMS message. Thus, the SMS message is not modified to include additional message fields. Rather, a value in the reserved teleservice space is modified. Replacement of the teleservice type identifier is based on a predetermined mapping between different teleservice type identifiers and message copy indicators. The predetermined mapping may be defined by a predetermined mapping table which stores a plurality of teleservice type identifiers for different teleservice types and maps each teleservice type identifier to at least one corresponding message copy indicator. Accordingly, each network device may access the predetermined mapping table to identify a message copy as well as the teleservice type. Because each network device has access to the same predetermined mapping, there is no need to synchronize all of the network devices with a database to keep track of message copies (among all of the network devices). Using the predetermined mapping and the message copy indicator, thus, does not increase a strain on the system, and does not add additional delay (compared with network devices that are synchronized).

The various examples disclosed herein relate to an SMS message copying service. Other mobile messaging services such as Enhanced Messaging Service (EMS) and Multimedia Messaging Service (MMS) messages may use similar looping protection techniques, although the protocols and procedures for EMS and/or MMS may avoid looping in other ways.

Reference now is made in detail to the examples illustrated in the accompanying drawings and discussed below. FIG. 1 illustrates a system 10 offering a variety of mobile communication services, including SMS message copying services for mobile device users. For the purposes of later discussion, four mobile devices 13-1, 13-2, 13-3 and 13-4 are shown in the drawing, to represent examples of the mobile devices that may receive various services via mobile communication network 15. The mobile devices 13 are examples of mobile devices that may be used for the SMS message copying service. However, the network 15 will provide similar communications for many other similar users as well as for mobile devices/users that do not participate in the SMS message copying service. The network 15 provides mobile wireless communications services to those devices as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion herein. The mobile communication network 10 provides communications between mobile devices as well as communications for the mobile devices within networks and devices 11 outside the mobile communication network 10.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13 are capable of voice telephone communications through the network 15, and for the SMS message copying service. The mobile devices 13 are capable of data communications through the particular type of network 15 (and the users thereof typically will have subscribed to a data service through the network).

The network 15 allows users of the mobile devices 13 (and other mobile devices not shown) to initiate and receive telephone calls to each other as well as through the public switched telephone network (PSTN) 19 and telephone stations 21 connected to the PSTN 19. The network 15 allows SMS text messaging between mobile devices and similar messaging with other devices via the Internet. The network 15 typically offers a variety of other data services via the Internet 23, such as downloads, web browsing, email, etc. By way of example, the drawing shows a laptop PC type user terminal 27 as well as a server 25 connected to the Internet 23; and the data services for the mobile devices 13 via the Internet 23 may be with devices like those shown at 25 and 27 as well as with a variety of other types of devices or systems capable of data communications through various interconnected networks. The mobile devices 13 of users of the SMS message copying service also can receive and execute applications written in various programming languages, as discussed more later.

The SMS message copying service under consideration here may be delivered to touch screen type mobile devices as well as to non-touch type mobile devices. For example, mobile devices 13-1 and 13-4 illustrate touch screen type devices, and mobile devices 13-2 and 13-3 illustrate non-touch type devices. In general, mobile devices 13 can take the form of portable handsets, smart-phones or personal digital assistants, although they may be implemented in other form factors. Program applications, including an application to assist in the SMS message copying service can be configured to execute on many different types of mobile device 13. For example, a mobile device application can be written to execute on a binary runtime environment for a mobile (BREW-based) mobile device, a Windows Mobile based mobile device, Android, iOS iPhone or iPad, Java Mobile, or RIM based mobile device such as a BlackBerry or the like. Some of these types of devices can employ a multi-tasking operating system.

The mobile communication network 15 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as SMSC 41. A regional portion of the network 10, such as that serving mobile devices 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13, when the mobile devices are within range. Each base station can include a BTS coupled to several antennae mounted on a radio tower within a coverage area often referred to as a "cell."

The BTS is the part of the radio network that sends and receives RF signals to/from the mobile devices 13 that are served by the base station 17. Later generations mobile networks (such as Long Term Evolution (LTE) networks) utilize wireless access elements, each referred to as an eNodeB, to provide functions similar to those of a base station; but for convenience, the discussion here will generally include eNodeBs and other network wireless access devices under the general term base station.

The radio access networks can also include a traffic network represented generally by the cloud at 15, which carries the user communications and data for the mobile devices 13 between the base stations 17 and other elements with or through which the mobile devices communicate. The network can also include other elements that support functionality other than device-to-device media transfer services such as SMS messages (as well as other messaging service messages such as Multimedia Messaging Service (MMS) messages, Rich Communication Suite (RCS) messages) and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the PSTN 19 and the Internet 23) either directly or indirectly.

The carrier will also operate a number of systems that provide ancillary functions in support of the communications services and/or application services provided through the network 10, and those elements may communicate with other nodes or elements of the network 10 via one or more private IP type packet data networks 29 (sometimes referred to as an Intranet), i.e., a private network. Generally such systems are part of or connected for communication via the private network 29. It should be apparent, however, to recognize that systems outside of the private network could serve the same functions as well. Examples of such systems, in this case operated by the network service provider as part of the overall network 10, which communicate through the intranet type network 29, include one or more web servers 33.

A mobile device 13 communicates over the air with a base station 17 and through the traffic network 15 for various voice and data communications, e.g., through the Internet 23 with a server 25 and/or with SMSC 41. If the mobile service carrier offers the SMS message copying service, the service may be hosted on SMSC 41, for communication via the networks 15 and 29. Servers such as 25 may provide any of a variety of common application or service functions in support of or in addition to an application program running on the mobile device 13. However, for purposes of further discussion, we will focus on functions thereof in support of the SMS message copying service. For a given service, including the SMS message copying service, an application program within the mobile device may be considered as a 'client' and the programming at SMSC 41 may be considered as the 'server' application for the particular service.

Wireless carriers developed the short message service (SMS) to transmit text messages for display on mobile devices. In many existing network architectures, the SMS traffic uses the signaling portion of the network 15 to carry message traffic between SMSC 41 and the mobile devices 13. The SMSC 41 supports mobile device to mobile device delivery of text messages. However, the SMSC 41 also supports communication of messages between the mobile devices 13 and devices coupled to other networks (including devices such as user terminal 27). For example, the SMSC 41 may receive incoming IP message packets from the Internet 23 for delivery via the network 15 from one of the BSs 17 to a destination mobile device 13. For this later type of SMS related communications, the network 10 also includes one or more Short Message Peer-to-Peer (SMPP) protocol gateways (not shown). The SMPP gateway provides protocol conversions, between the SMPP as used by the SMSC 41 and the protocols used on the Internet 23 or other IP networks. SMPP messages ride on IP transport, e.g., between the SMPP gateway and the SMSC 41.

The network 10 supports SMS message copying services which enable a subscriber to send and receive copies of SMS messages, while limiting messaging loops. To this end, network 10 includes SMSC 41 and database 43. Database 43 includes a predetermined mapping (e.g., as defined in a mapping table) between different teleservice type identifiers and message copy indicators. Example predetermined mapping tables are shown in Tables 1 and 2 and described further below with respect to FIGS. 2-5.

Figure 2:
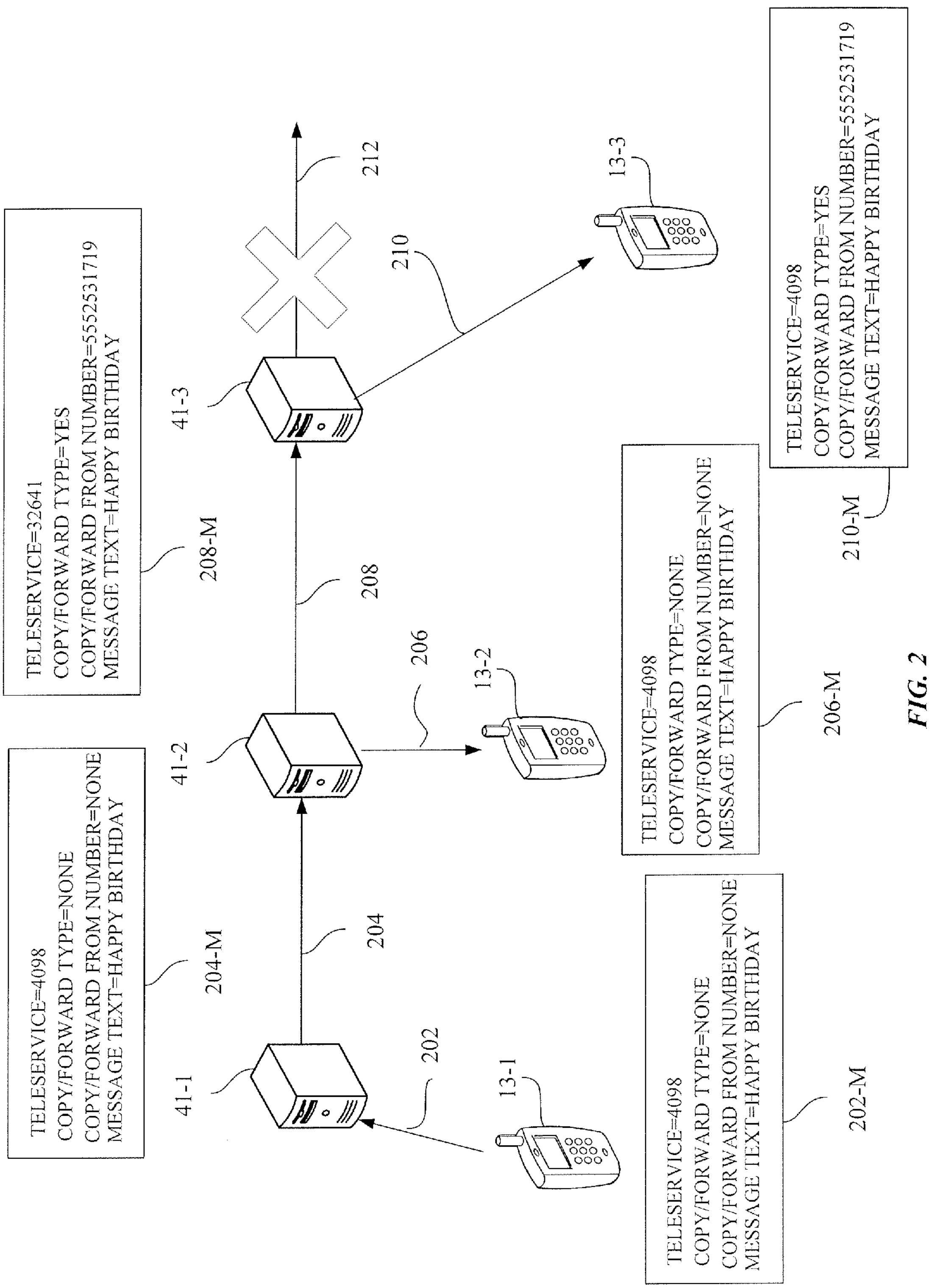
FIG. 2 is a diagram illustrating an exemplary SMS message copy sequence for permitting SMS message copying over a single hop.
Figure 3:
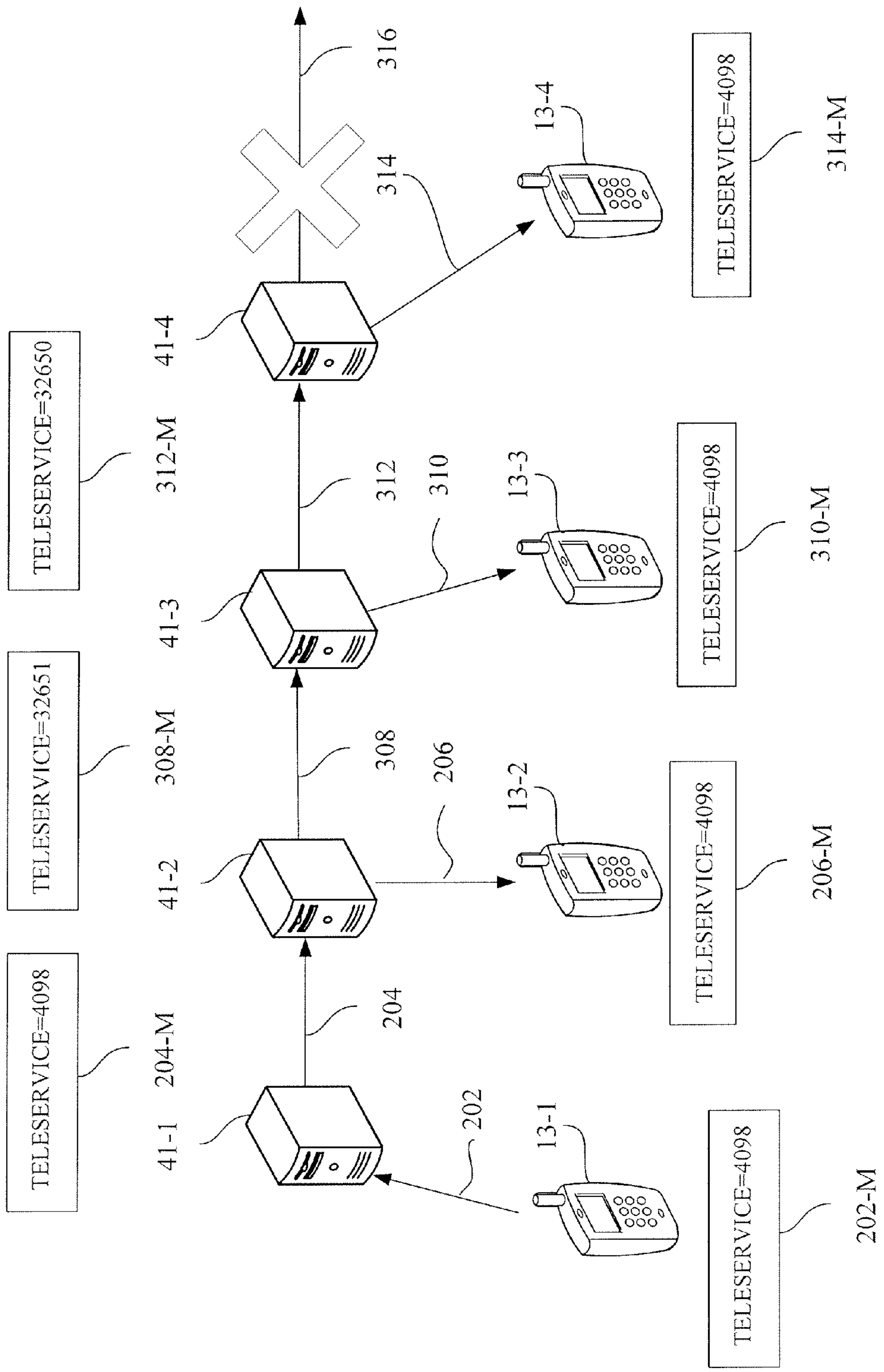
FIG. 3 is a diagram illustrating an exemplary SMS message copy sequence for permitting SMS message copying over multiple hops.

To send a copy of an SMS message, the SMSC 41 replaces a teleservice type identifier in a reserved teleservice space of the SMS message with a message copy indicator based on the predetermined mapping table stored in database 43. To limit messaging loops, the SMSC 41 determines whether the SMS message is enabled for copying, by detecting the message copy indicator in the teleservice space of the SMS message. A detected message copy indicator may indicate that no further copies are allowed (such as for a single hop copy, shown in FIG. 2), or may indicate how many further hops are permitted (as shown in FIG. 3).

For simplicity, FIG. 1 illustrates a single SMSC 41. In general, network 10 includes one or more SMSCs 41, as illustrated in FIGS. 2 and 3. Each SMSC 41 is associated with one or more mobile devices 13 for sending and receiving messages between the mobile devices 13. Although FIG. 1 illustrates database 43 as a separate physical database connected to the network 15, database 43 may reside on each SMSC 41. The SMSC 41 and database 43 are described further below with respect to FIGS. 2-5.

A carrier may also offer its subscribers on-line access to a variety of functions related to the subscribers' accounts, such as review of billing statements and usage data, on-line payment, subscription changes, password control or the like. For that purpose, the carrier in the example shown in FIG. 1 operates a customer account web server 33, offering an account subscriber interface via the Internet. The subscriber interface provides a login mechanism for distinguishing an authorized customer and allowing the customer to access on-line information about the customer's account. Hence, a user's mobile device and/or a user's terminal, such as PC 27, may be used to access on-line information about a subscriber's account, which the mobile carrier makes available via the carrier's account web site accessible through the Internet 23 (or network 15).

Web server 33 provides the customer with the ability to subscribe and/or unsubscribe to the SMS message copying service offered by SMSC 41. To insure that the application service offered by SMSC 41 is available to only authorized devices/users, the SMSC 41 may use the subscription information of web server 33 for authorization. Upon successful authentication of an (authorized) mobile device, the server 33 informs the SMSC 41, which in turn provides access to the SMS message copying service as outlined herein.

Figure 4:
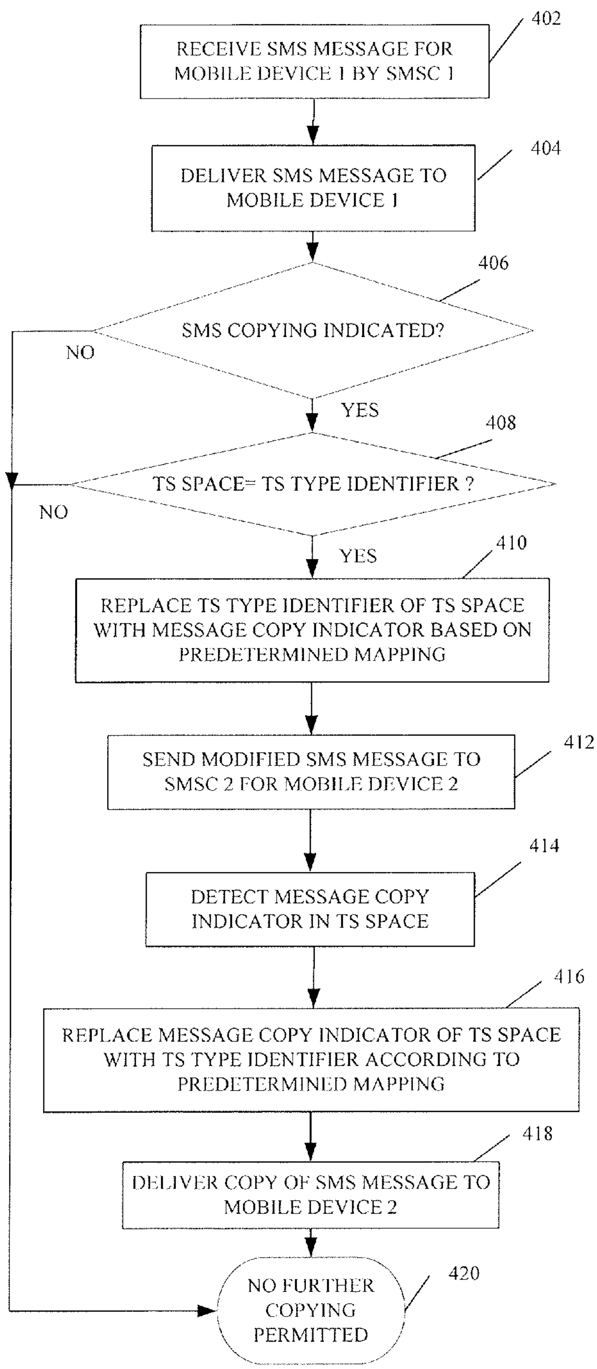
FIG. 4 is a flow chart of an exemplary method for SMS message copying.

Referring now to FIG. 2 and FIG. 4, an SMS message copying method which limits messaging loops is described. In particular, FIG. 2 is a diagram illustrating an exemplary SMS message copy sequence for permitting SMS message copying over a single hop; and FIG. 4 is a flow diagram of an exemplary method for SMS message copying.

At step 402, an SMS message 204 for mobile device 13-2 is received by SMSC 41-2 (also referred to herein as SMSC 1). For example, mobile device 13-1 originates an SMS message 202 for delivery to mobile device 13-2 (also referred to herein as mobile device 1) with a standard teleservice.

A portion 202-M of SMS message 202 is shown. Portion 202-M includes a teleservice space (i.e., a field) which includes a teleservice type identifier. The teleservice type identifier (e.g., 4098) indicates, for example, that SMS message 202 is a CMT type teleservice. Portion 202-M includes other fields, such as a copy/forward type field, a copy/forward from number field as well as a message text field. Portion 202-M includes other fields (not shown), such as fields related to a message arrival time, an originating device identifier, a terminating device identifier, etc.

Responsive to an indication from the mobile device 13-1 to send SMS message 202 to mobile device 13-2, SMSC 41-1 forms and delivers SMS message 204 to SMSC 41-2 (i.e., SMSC 1). As shown in FIG. 2, portion 204-M of SMS message 204 includes the same teleservice indicator as portion 202-M of SMS message 202.

At step 404, SMSC 41-2, delivers SMS message 206 to mobile device 13-2 (i.e., mobile device 1) according to the teleservice type indicated in portion 204-M of SMS message 204. As shown in FIG. 2, portion 206-M of SMS message 206 includes the same teleservice indicator as portion 202-M of SMS message 202.

At step 406, it is determined, by SMSC 41-2, whether an SMS copy indication (e.g., carbon copy and/or copy forward) is identified for sending a copy of SMS message 204 to mobile device 13-3 (i.e., mobile device 2). The copy indication is associated with the sender (mobile device 13-1) or the first mobile device (mobile device 13-2) and instructs the first network device to send a copy of the received SMS message to a second mobile device. For example, for carbon copy, the copy indication may be associated with the sender (mobile device 13-1). For copy forward, the copy indication may be associated with the first mobile device (mobile device 13-2). The copy indication may be enabled for the particular SMS message and/or for all SMS messages. For example, the copy indication may be enabled for all SMS messages received from a particular user and/or for a specific time period (such as during business hours). In other examples, the copy indication may be enabled for incoming messages, outgoing messages, specific entities (such as people or organizations) and/or dependent upon message context. For example, detection of specific keywords in the SMS message text may cause the copy indication to be enabled.

The SMSC 41-2 has a copy indication associated with the received SMS message. For a carbon copy type service, the copy indication may be received from the sender with or around the time the message is received from the sender. For a copy forward service, the intended first recipient may send the indication around the time of the message, but in many cases will have pre-established the copy forward service, for example by an appropriate means of subscribing to and setting up the forwarding service with the operator of the SMSC 41. In this later case, the first network device (SMSC-41-2) will store or have access to a stored service profile associated with the first mobile device (mobile device 13-2) that includes the copy forward indicator and any other appropriate information for the copy forwarding (e.g., identifications of one or more forward-to destinations).

If, at step 406, an SMS copy indication is not identified, step 406 proceeds to step 420, and the process is terminated.

If, at step 406, an SMS copy indication is identified, step 406 proceeds to step 408. At step 408, responsive to the SMS copy indication, it is determined (by SMSC 41-2) whether the teleservice space (also referred to herein as TS space) includes a teleservice (TS) type identifier (i.e., teleservice type identifier 4098 in portion 204-M of SMS message 204) (as opposed to a message copy indicator, described further below).

If at step 408, the teleservice space does not include the teleservice type identifier, step 406 proceeds to step 420, no further copying is permitted and the process is terminated. For example, if the teleservice space of portion 204-M included a message copy identifier, this would indicate that message 204 is copy and, thus, no further copying would be permitted.

If, at step 408, the teleservice space includes the teleservice type identifier, step 406 proceeds to step 410. At step 410, SMSC 41-2 replaces the teleservice type identifier in the teleservice space with a message copy indicator to form (modified) SMS message 208. For example, portion 208-M of SMS message 208 illustrates a message copy indicator value of 32641. The teleservice type identifier is replaced with the message copy indicator according to a predetermined mapping such as defined in a predetermined mapping table (stored in database 43 (FIG. 1)). An example predetermined mapping table is shown in Table 1 below.

The predetermined mapping table shown in Table 1 stores a plurality of teleservice type identifiers for different teleservice types (e.g., DNP, CMT, MWI, WAP, EMS) and maps each teleservice type identifier to a corresponding message copy indicator. Thus, an SMSC 41 can determine the teleservice type directly from the teleservice type identifier or indirectly from the message copy indicator. It is understood that Table 1 represents an example mapping table, and that other mappings are permissible. Although Table 1 illustrates standard teleservice type identifiers, it is understood that the teleservice type identifiers are inclusive of, but not limited to standard teleservice type identifiers. For example, teleservice type identifiers may include values that are proprietary or reserved.

TABLE 1

Predetermined Mapping Table for a Single Copy

| Teleservice Type | Teleservice Type Identifier | Message Copy Indicator |
|---|---|---|
| DNP | 4097 | 32640 |
| CMT | 4098 | 32641 |
| MWI | 4099 | 32642 |
| WAP | 4100 | 32643 |
| EMS | 4101 | 32644 |

At step 412, SMSC 41-2 sends the modified SMS message 208 to SMSC 41-3 (i.e., SMSC 2) for delivery to the mobile device 13-3 (i.e., mobile device 2).

At step 414, responsive to receiving modified SMS message 208, SMSC 41-3 (i.e., SMSC 2) detects the message copy indicator in the teleservice space of SMS message. For example, SMSC 41-3 detects message copy indicator 32641 in portion 208-M of SMS message 208.

At step 416, responsive to the detected message copy indicator, SMSC 41-3 replaces the message copy indictor (32641) in the teleservice space with the teleservice type identifier (4098), based on the predetermined mapping, e.g., as defined in a predetermined mapping table (stored in the database 43 shown in FIG. 1), to form message 210. As shown in FIG. 2, portion 210-M of SMS message 210 includes the original teleservice type identifier (e.g., 4098) of SMS message 202. SMS message 210 represents a copy of SMS message 202. Thus, detection of the message copy indicator is used to determine whether the modified SMS message 208 is enabled for copying.

At step 418, the copy of the SMS message (i.e., message 210) is delivered, by SMSC 41-3 (i.e., SMSC 2) to mobile device 13-3 (i.e., mobile device 2). Step 418 proceeds to step 420 and no further copying is permitted. Thus, even if SMSC 41-3 receives a further copy indication (for copy forward and/or carbon copy) to copy the SMS message 208, detection of the message copy indicator in the teleservice space by the SMSC 41-3 prevents the SMS message 208 from being copied or forward (as SMS message 212).

As described above, SMSC 41-3 replaces the message copy indicator in the teleservice space with the teleservice type identifier, prior to delivering the message copy 210 to mobile device 13-3. Accordingly, the message copy 210 (at the mobile device 13-3) appears to be a normal SMS message and may be processed by mobile device 13-3 in a normal SMS manner. Thus, SMSCs 41 perform message copying and loop prevention, whereas no additional processing is required by the mobile devices 13.

Figure 5:
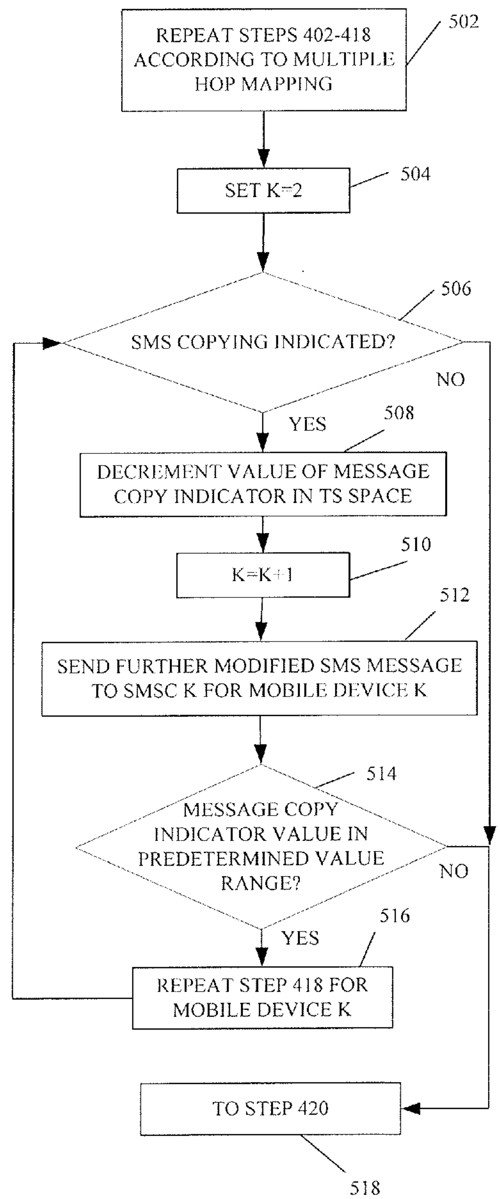
FIG. 5 is a flow chart of another exemplary method for SMS message copying.

Referring now to FIG. 3 and FIG. 5, an SMS message copying method for multiple hops which limits messaging loops is described. In particular, FIG. 3 is a diagram illustrating an exemplary SMS message copy sequence for permitting SMS message copying over multiple hops; and FIG. 5 is a flow diagram of an exemplary method for SMS message copying.

At step 502, steps 402-418 (FIG. 4) are repeated using a predetermined multiple hop mapping (e.g., as defined by a predetermined multiple hop mapping table). Thus, steps 402-418 are performed similarly in FIG. 3 as in FIG. 2. In FIG. 3, however, step 410 replaces the teleservice type identifier with a message copy indicator according to the predetermined mapping table shown in Table 2 (a multiple hop mapping table), to form modified SMS message 308. SMS message 308 is similar to SMS message 208, except that the message copy indicator in portion 308-M of SMS message 308 is 32651 (rather than 32641 as shown in FIG. 2). SMS message 310 is the same as SMS message 210 (where the message copy indicator is replaced by the corresponding teleservice type identifier 4098), as shown in portion 310-M.

The predetermined mapping table shown in Table 2 stores a plurality of teleservice type identifiers for different teleservice types (e.g., DNP, CMT, MWI, WAP, EMS) and maps each teleservice type identifier to a corresponding message copy indicator having a range of values (e.g., 32650-32659 for the CMT teleservice). According to an example, the number of values (in the range of values) corresponds to a number of allowable hops. The multiple hops are used to convey the SMS message 202 from the source (mobile device 13-1) to a destination. Similarly to Table 1, an SMSC 41 can determine the teleservice type directly from the teleservice type identifier or indirectly from the message copy indicator. It is understood that Table 2 represents an example mapping table, and that other mappings are permissible. Although Table 2 illustrates standard teleservice type identifiers, it is understood that the teleservice type identifiers are inclusive of, but not limited to standard teleservice type identifiers. For example, teleservice type identifiers may include values that are proprietary or reserved.

TABLE 2

Predetermined Mapping Table for Multiple Hops

| Teleservice Type | Teleservice Type Identifier | Message Copy Indicator Range |
|---|---|---|
| DNP | 4097 | 32640-32649 |
| CMT | 4098 | 32650-32659 |
| MWI | 4099 | 32660-32669 |
| WAP | 4100 | 32670-32679 |
| EMS | 4101 | 32680-32689 |

At step 504, K is set to 2, where K represents an SMSC 41 or a mobile device 13. The value K is used to simplify the description of FIG. 5 for multiple hops.

At step 506, responsive to delivery of the SMS message 310 to the mobile device 13-3 (i.e., mobile device 2), it is determined (by SMSC 41-3) whether an SMS copy indication (e.g., carbon copy and/or copy forward) is identified for sending a copy of SMS message 308 to the mobile device 13-4 (i.e., mobile device K+1).

If, at step 506, an SMS copy indication is not identified, step 506 proceeds to step 518 (which proceeds to step 420 of FIG. 4), and the process is terminated. As discussed above, the copy indication may be enabled for the particular SMS message and/or for all SMS messages. As discussed above, the copy indication is associated with the sender or a further mobile device.

If, at step 506, an SMS copy indication is identified, step 506 proceeds to step 508. At step 508, responsive to the SMS copy indication, (and the detected message copy indicator determined at step 414 of FIG. 4), SMSC K (i.e., SMSC 41-3) decrements the value of the message copy indicator in the teleservice space, to form further modified message 312. As shown in FIG. 3, portion 312-M includes decremented message copy indicator 32650 (as compared with the value in the portion 308-M). At step 510, K is incremented, to form K+1.

At step 512, responsive to the SMS copy indication, SMSC 41-3 sends the further modified message 312 to SMSC K (i.e., SMSC 41-4).

At step 514, responsive to receiving the further modified message 312, SMSC K (i.e., SMSC 41-4) determines whether a value of the message copy indicator (in the teleservice space of SMS message 312) is within the predetermined value range, based on the predetermined mapping, e.g., as defined in a mapping table (such as Table 2).

If it is determined, by the SMSC K (e.g., SMSC 41-4), that the value is within the predetermined value range, step 514 proceeds to step 516. For example, if the message copy indicator value (e.g., 32650 as shown in portion 312-M) is between 32650-32659 (see Table 2), step 514 proceeds to step 516. At step 516, step 418 (FIG. 4) is repeated for the mobile device K (e.g., mobile device 13-4) to form SMS message 314. As shown in FIG. 3, portion 314-M of SMS message 314 includes the original teleservice type identifier (e.g., 4098) of SMS message 202. Thus, SMS message 314 represents a (further) copy of SMS message 202. Step 516 proceeds to step 506 and steps 506-516 are repeated for a number of allowable hops (based on the predetermined value range for the message copy indicator).

If it is determined, by the SMSC K (i.e., SMSC 41-4), that the value is not within the predetermined value range, step 514 proceeds to step 518, and the process is terminated. Thus, even if SMSC 41-4 receives a further copy indication (for copy forward and/or carbon copy) to copy the SMS message 312, detection of a value of the message copy indicator in the teleservice space by the SMSC 41-4 that is out of the predetermined value range prevents the SMS message 312 from being copied or forwarded (as SMS message 314).

As shown by the above discussion, functions relating to the SMS message copying service may be implemented on computers connected for data communication via the components of a packet data network, operating as the various servers and/or client mobile devices as shown in FIG. 1. Although special purpose devices may be used for servers operating as the message service centers, such devices also may be implemented using one or more hardware platforms intended to represent a general class of data processing device commonly used to run "server" programming so as to implement the SMS message copying functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the SMS message copying service. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for SMS message copying, in essentially the manner performed in the implementations discussed and illustrated herein.

Figure 7:
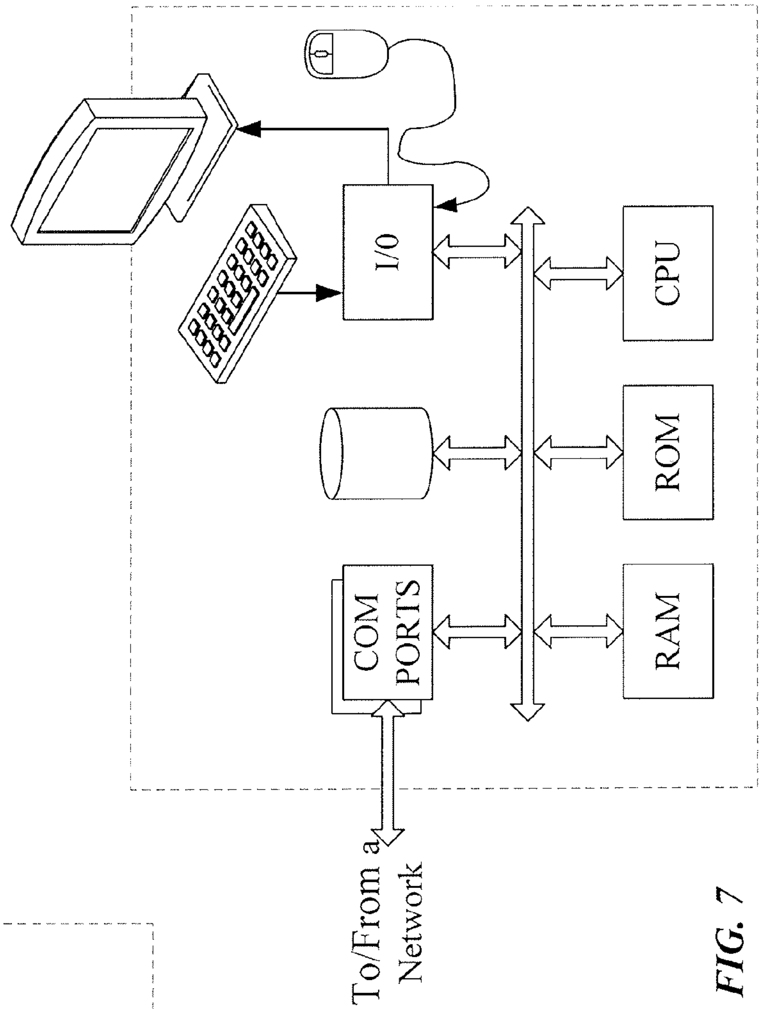
FIG. 7 is a simplified functional block diagram of a personal computer or other work station or terminal device.
Figure 6:
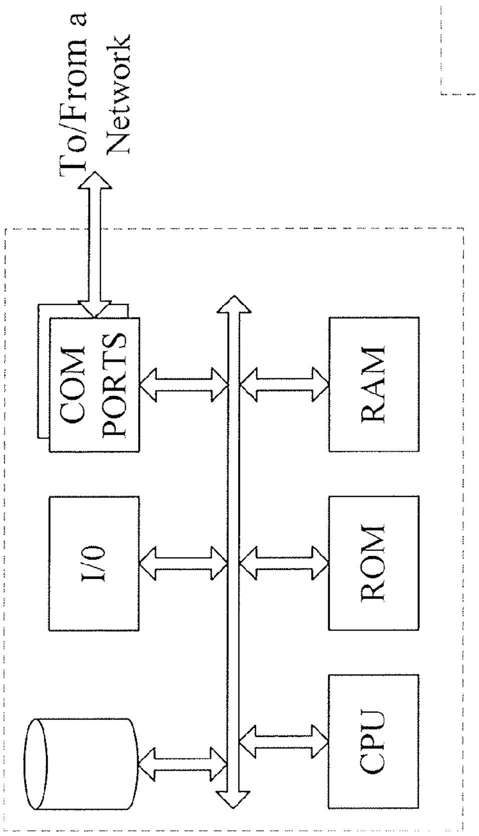
FIG. 6 is a simplified functional block diagram of a computer that may be configured as a host or server, for example, to function as the SMS center (SMSC) in the system of FIG. 1.

FIGS. 6 and 7 provide functional block diagram illustrations of general purpose computer hardware platforms. FIG. 6 illustrates a network or host computer platform, as may typically be used to implement a server, including the SMSC 41 (FIG. 1). FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the SMS message copying service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.

BREW—Binary Runtime Environment for Mobile
CD-ROM—Compact Disk Read Only Memory
CMT—Cellular Messaging Teleservice
CPU—Central Processing Unit
DNP—Distributed Network Protocol
DVD—Digital Video Disk
DVD-ROM—Digital Video Disk Read Only Memory
EMS—Enhanced Messaging Service
EPROM—Erasable Programmable Read Only Memory
EEPROM—Electrically Erasable Programmable Read Only Memory
FLASH-EPROM—Flash Erasable Programmable Read Only Memory
IP—Internet Protocol
MMS—Multimedia Messaging Service
MSC—Message Service Center
MWI—Message Waiting Indicator
PROM—Programmable Read Only Memory
RAM—Random Access Memory
RCS—Rich Communication Suite
RF—Radio Frequency
RIM—Research in Motion
ROM—Read Only Memory
SMS—Short Message Service
SMSC—Short Message Service Center
WAP—Wireless Application Protocol

What is claimed is:

1. A method comprising:

receiving, through a wireless communication network, and at a first network device, a short message service (SMS) message;

delivering, through the wireless communication network and from the first network device, the received SMS message to a first mobile device identified as a destination for the received SMS message;

identifying a copy indication to send a copy of the received SMS message to a second mobile device;

replacing, by the first network device, a teleservice type identifier in a teleservice space of the received SMS message with a message copy indicator based on a predetermined mapping between the teleservice type identifier and the message copy indicator, responsive to identifying the copy indication, to form a modified SMS message; and sending, through the wireless communication network, the modified SMS message to a second network device associated with the second mobile device, wherein it is determined, by the second network device, whether the modified SMS message is enabled for copying, by detecting the message copy indicator in the teleservice space of the modified SMS message, and wherein the predetermined mapping maps a plurality of teleservice type identifiers for different teleservice types and maps each teleservice type identifier to at least one corresponding message copy indicator.

2. The method of claim 1, the method further comprising:

responsive to detecting the message copy indicator in the modified SMS message, replacing, by the second network device, the message copy indicator with the teleservice type identifier in the teleservice space of the modified SMS message based on the predetermined mapping, to form the copy of the SMS message.

3. The method of claim 2, wherein the second network device prevents further copying of the SMS message regardless of receiving a further copy indication, based on the message copy indicator.

4. The method of claim 1, the method further comprising:

identifying, by the second network device, a further copy indication for sending a further copy of the SMS message to at least one further mobile device;

decrementing, by the second network device, a value of the message copy indicator in the teleservice space of the modified SMS message, to form a further modified SMS message, the message copy indicator including a predetermined range of values associated with the teleservice type identifier; and sending, through the wireless communication network, the further modified SMS message to at least one further network device associated with the at least one further mobile device.

5. The method of claim 4, the method further comprising:

determining, by the at least one further network device, whether the further modified SMS message is enabled for copying, based on whether the decremented value of the message copy indicator is in the predetermined range of values; and allowing the further modified SMS message to be delivered to the at least one further mobile device when the decremented value of the message copy indicator is within the predetermined range of values.

6. The method of claim 1, the method further comprising, prior to the replacing of the teleservice type identifier:

determining, by the first network device, whether the received SMS message is enabled for copying, by detecting the teleservice type identifier in the teleservice space of the received SMS message.

7. The method of claim 1, wherein the copy indication includes at least one of a copy forward indication or a carbon copy indication.

8. The method of claim 1, wherein the teleservice type identifier includes at least one of a distributed network protocol (DNP) identifier, a cellular messaging teleservice (CMT) identifier, a message waiting indicator (MWI) identifier, a wireless application protocol (WAP) identifier or an enhanced messaging service (EMS) identifier.

9. A system comprising:

a first message service center (MSC) and a second MSC, wherein the first MSC is configured to:

receive, through a wireless communication network, a short message service (SMS) message, deliver, through the wireless communication network, the received SMS message to a first mobile device identified as a destination for the received SMS message, identify a copy indication to send a copy of the received SMS message to a second mobile device, replace a teleservice type identifier in a teleservice space of the received SMS message with a message copy indicator based on a predetermined mapping between the teleservice type identifier and the message copy indicator, responsive to identifying the copy indication, to form a modified SMS message, and send, through the wireless communication network, the modified SMS message to the second MSC associated with the second mobile device, wherein the second MSC is configured to determine whether the modified SMS message is enabled for copying, by detecting the message copy indicator in the teleservice space of the modified SMS message, and wherein the predetermined mapping maps a plurality of teleservice type identifiers for different teleservice types and maps each teleservice type identifier to at least one corresponding message copy indicator.

10. The system of claim 9, wherein the teleservice type identifier includes at least one of a distributed network protocol (DNP) identifier, a cellular messaging teleservice (CMT) identifier, a message waiting indicator (MWI) identifier, a wireless application protocol (WAP) identifier or an enhanced messaging service (EMS) identifier.

11. The system of claim 9, wherein the copy indication includes at least one of a copy forward indication or a carbon copy indication.

12. The system of claim 9, wherein the second MSC is configured to:

responsive to detecting the message copy indicator in the modified SMS message, replace the message copy indicator with the teleservice type identifier in the teleservice space of the modified SMS message based on the predetermined mapping, to form the copy of the SMS message.

13. The system of claim 12, wherein the second MSC is configured to prevent further copying of the SMS message regardless of receiving a further copy indication, based on the message copy indicator.

14. The system of claim 9, wherein the second MSC is configured to:

identify a further copy indication for sending a further copy of the SMS message to at least one further mobile device;

decrement a value of the message copy indicator in the teleservice space of the modified SMS message, to form a further modified SMS message, the message copy indicator including a predetermined range of values associated with the teleservice type identifier; and send, through the wireless communication network, the further modified SMS message to at least one further MSC associated with the at least one further mobile device.

15. The system of claim 14, wherein the at least one further MSC is configured to:

determine whether the further modified SMS message is enabled for copying, based on whether the decremented value of the message copy indicator is in the predetermined range of values; and allow the further modified SMS message to be delivered to the at least one further mobile device when the decremented value of the message copy indicator is within the predetermined range of values.

16. A non-transitory computer readable medium that stores instructions in at least one storage device executable by one or more network devices to cause the one or more network devices to perform functions, including functions to:

receive, through a wireless communication network, a short message service (SMS) message, deliver, through the wireless communication network, the received SMS message to a first mobile device identified as a destination for the received SMS message, identify a copy indication for sending a copy of the received SMS message to a second mobile device, replace a teleservice type identifier in a teleservice space of the received SMS message with a message copy indicator based on a predetermined mapping, stored in a database, between the teleservice type identifier and the message copy indicator, responsive to identifying the copy indication, to form a modified SMS message, and send, through the wireless communication network, the modified SMS message to a network device associated with the second mobile device, wherein it is determined, by the network device associated with the second mobile device, whether the modified SMS message is enabled for copying, by detecting the message copy indicator in the teleservice space of the modified SMS message, and wherein the predetermined mapping maps a plurality of teleservice type identifiers for different teleservice types and maps each teleservice type identifier to at least one corresponding message copy indicator.

17. The non-transitory computer readable medium of claim 16, wherein the functions further include functions to:

responsive to detecting the message copy indicator in the modified SMS message, replace the message copy indicator with the teleservice type identifier in the teleservice space of the modified SMS message based on the predetermined mapping, to form the copy of the SMS message.

18. The non-transitory computer readable medium of claim 16, wherein the functions further include functions to:

identify, by the network device associated with the second mobile device, a further copy indication for sending a further copy of the SMS message to at least one further mobile device;

decrement, by the network device associated with the second mobile device, a value of the message copy indicator in the teleservice space of the modified SMS message, to form a further modified SMS message, the message copy indicator including a predetermined range of values associated with the teleservice type identifier; and send, through the wireless communication network, the further modified SMS message to at least one further network device associated with the at least one further mobile device.

19. The non-transitory computer readable medium of claim 18, wherein the functions further include functions to:

determine, by the at least one further network device, whether the further modified SMS message is enabled for copying, based on whether the decremented value of the message copy indicator is in the predetermined range of values; and allow the further modified SMS message to be delivered to the at least one further mobile device when the decremented value of the message copy indicator is within the predetermined range of values.

* * * * *